United States Patent [19]

De Vos et al.

[11] 4,059,423

[45] Nov. 22, 1977

[54] PROCESS FOR THE PREPARATION OF EXPANSIBLE BEADS

[75] Inventors: Daniel De Vos, Jette; Paul-Marie Michel, Jumet; Alfred Berger, Jamioulx, all of Belgium

[73] Assignee: Sovitec S.A., Charleroi, Belgium

[21] Appl. No.: 701,966

[22] Filed: July 1, 1976

[30] Foreign Application Priority Data

July 17, 1975 United Kingdom .............. 30089/75

[51] Int. Cl.² ...................... C03B 19/08; C03B 19/10
[52] U.S. Cl. .............................................. 65/21; 65/22; 106/40 V; 106/74; 106/75; 264/15; 264/43
[58] Field of Search ................. 65/21, 22; 264/15, 43; 106/75, 74, 40 V

[56] References Cited

U.S. PATENT DOCUMENTS

| | | | |
|---|---|---|---|
| 2,978,339 | 4/1961 | Veach et al. .................. 65/22 X |
| 2,978,340 | 4/1961 | Veach et al. .................. 106/40 V |
| 3,458,332 | 7/1969 | Alford et al. .................. 106/75 X |
| 3,532,480 | 10/1970 | D'Eustachio .................. 65/22 X |
| 3,699,050 | 10/1972 | Henderson .................. 65/21 X |

*Primary Examiner*—Robert L. Lindsay, Jr.
*Attorney, Agent, or Firm*—Cushman, Darby & Cushman

[57] ABSTRACT

A process for the preparation of expansible beads which are convertible by firing into cellular glass bodies, such process comprising the steps of preparing a slip having a liquid medium continuous phase and a disperse phase, the slip containing particles of glass or glass-forming material, a cellulating agent, and a binder, the disperse phase of the slip including at least most of the particles, dividing the slip into drops, and subjecting the drops while in divided condition to a heat treatment including heating and cooling stages so as to cause evaporation of liquid from the drops and conversion thereof into self-sustaining beads in which the glass or glass-forming particles are held together by the binder and which contain the cellulating agent or gas derived therefrom.

23 Claims, 1 Drawing Figure

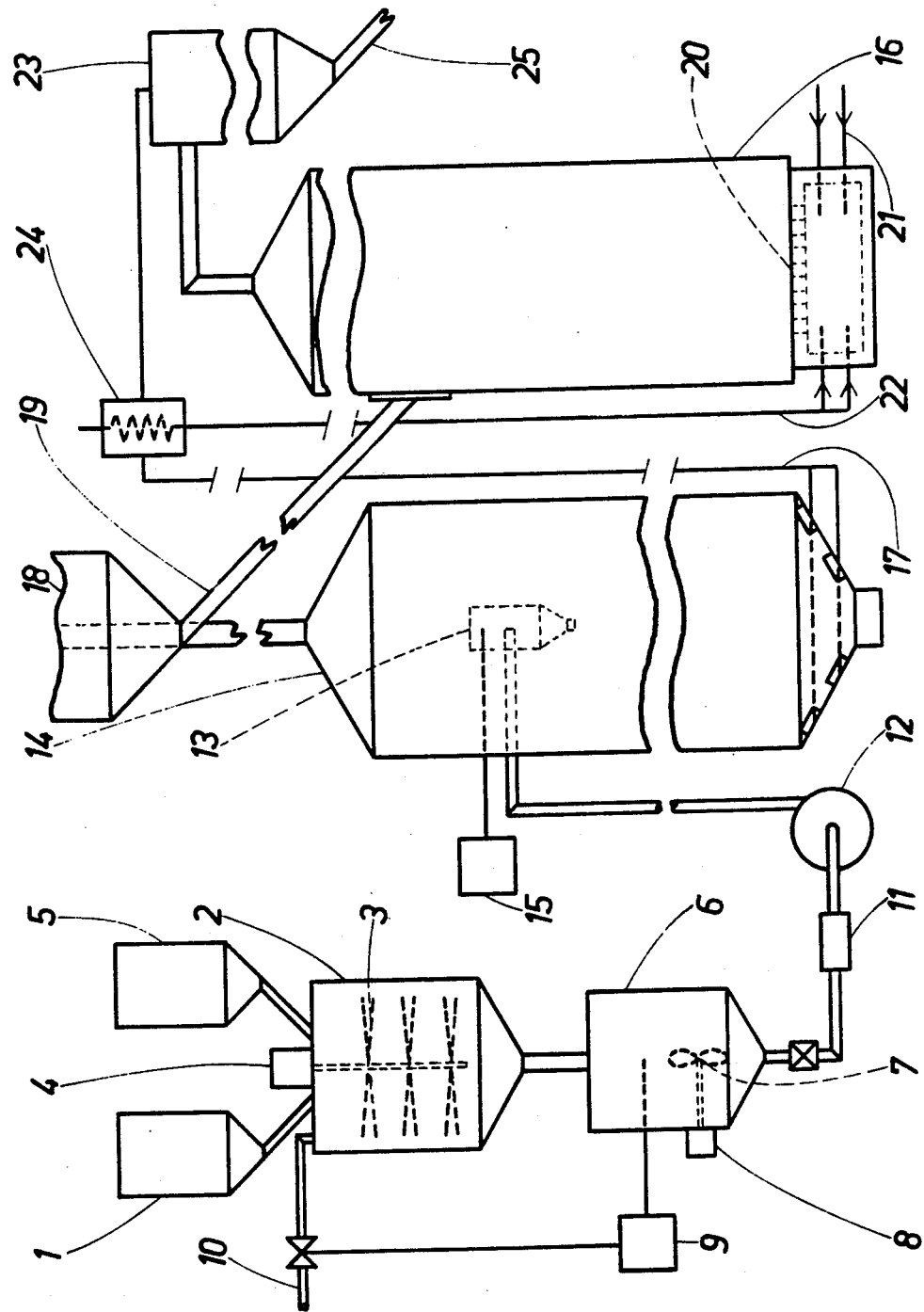

PROCESS FOR THE PREPARATION OF EXPANSIBLE BEADS

This invention relates to a process for the preparation of expansible beads which are convertible by firing into cellular glass bodies, such process comprising preparing a feedstock containing glass particles or particles of glass-forming material, and a cellulating agent, divided such feedstock into portions, and consolidating such portions by heating and cooling. Such expansible beads can be used inter alia as feedstock for a furnace in which the beads are converted to individual expanded glass bodies. The invention also relates to expansible beads formed by said process and to expanded glass bodies formed from such beads.

Various processes for forming expansible glass-containing beads are known but the known processes have certain inherent disadvantages which in practice limit their industrial application. The known processes involve rather complicated procedures for forming a feedstock from a mixture of crushed glass and cellulating agent. This preparation requires a number of successive steps which are very time consuming. Generally a cohesive mass is formed from a mixture of crushed glass and cellulating agent and this mass is divided in a type of briquetting machine or by extrusion, to form nodules or pellets for feeding into a furnace wherein the glass particles become sintered. It is difficult to form nodules or pellets of controlled composition at satisfactory production rates. The rate of nodule or pellet formation cannot match the potential throughout capacities of tube or other furnaces working on a continuous flow principle. A further disadvantage of that known procedure is the fact that it is not suitable for forming beads of small dimensions, e.g. beads below 3 mm in size.

The present invention aims to provide a process whereby expansible beads of controlled composition can be produced at relatively high production rates, using comminuted glass as a starting material. A further object of the invention is to provide a process which is more easily and conveniently performed than the known processes, particularly with respect to the preparation and handling of the feedstock.

According to the present invention, there is provided a process for the preparation of expansible beads which are convertible by firing into cellular glass bodies. The process includes the preparation of a slip having a liquid medium continuous phase and a disperse phase, the slip containing particles of glass or glass-forming material, a cellulating agent, and a binder, the disperse phase of the slip including at least most of said particles.

The slip is then divided into drops. The drops, while in divided condition, are then subjected to a heat treatment including heating and cooling stages so as to cause evaporation of liquid from the drops and conversion thereof into self-sustaining beads in which glass or glass-forming particles are held together by the binder and which contain the cellulating agent or gas derived therefrom.

A process according to the invention as above defined lends itself to high bead production rates. This is due to the fact that the material prepared for division into separate portions for heating is a slip. The term "slip" is used to denote a solids/liquid suspension, as such term is used in ceramics technology, but with the proviso that while water is much the preferred material for forming the continuous phase of the slip, it is not essential to use water for such phase in carrying out the present invention. The use of a slip represents a marked departure from the known processes hereinbefore described. Such a feedstock can be prepared much more easily than those required for the performance of the previously known processes. A suitable slip can be prepared in a very simple manner. The preparation of the feedstock does not require a succession of rather time consuming steps and can be carried out in a much shorter time. By virtue of its physical nature the composition of a slip can be made uniform more easily than can a cohesive moldable mass. Moreover, it is very much easier to divide the slip into drops of appropriate size than it is to mold nodules or pellets. The drops can be formed continuously at a rate far exceeding that at which pellets can be formed by a pelletizing machine.

Provided the binder material is appropriately chosen, the process can be performed at relatively low temperatures. Unlike the known processes above referred to, the formation of the beads does not necessitate sintering of glass particles.

As will hereafter be exemplified, beads manufactured by a process according to the invention can be transformed into unitary porous or cellular glass bodies by a conventional firing step. The size and form of the fired bodies are related to the size and form of the beads (which in this case can be regarded as "green" bodies) and can be predetermined within close limits.

If the cellulating agent does not function to cause cellulation of the beads during their formation, such agent will function when the beads are subsequently fired as above referred to. However, it is an advantage to choose the cellulating agent so that cellulation of the beads occurs during their formation, even if the heat treatment is a relatively low temperature treatment. The process may be controlled so that the formed beads are gas-filled hollow beads of substantially spherical form, the substantially spherical shells of the beads being composed of the glass or glass-forming particles held together by the binder. This shell may itself contain small gas-filled cells or pores. As an alternative, the process can be controlled so that the formed beads are not hollow but are of porous or multi-cellular form throughout their cross-section. Examples of suitable process conditions for achieving the different results are given hereafter. Preferably the beads contain at least one closed cell. The gas present in such cell or cells will exert pressure internally of the beads during eventual firing thereof, even before any flow of the solid material of the body takes place. Consequently, as soon as the solid material becomes flowable, outward displacement of such solid material occurs in all directions around the cells. This behavior of the material favors the production of a fired body having a high volume/weight ratio.

The viscosity of the suspension is a factor of importance for achieving the best results when carrying out the present invention. The viscosity is, of course, in all cases very much lower than that of the feedstock used for forming the nodules or pellets in the previously known processes. On the other hand, it is preferable not to employ more liquid than is necessary for making the feedstock easy to homogenize, e.g., by stirring, and capable of being easily divided into drops by whatever method is used for this purpose.

In preferred embodiments of the invention, the slip, at the stage of its division into drops, has a viscosity between 200 and 100,000 centipoises (cp). It has been found that, other things being equal, the process can be performed to its best advantages when the feedstock is within that viscosity range. A particularly preferred viscosity range is 200 to 10,000 cp. Such slips lend themselves particularly well to low cost processing.

The drops into which the feedstock is divided are preferably in the size range of 100 to 3,000 microns.

The liquid medium is preferably water. Water is preferred because it has entirely satisfactory properties for the purpose in view and is readily available at low cost. Preferably the feedstock which is divided into drops is an aqueous slip and the water is present in a proportion of less than 50% by weight based on the total weight of the slip. By observing that upper limit, it is possible to bring about sufficient evaporation of water from the individual drops in very short heating periods. The optimum proportions of water are in the range 20 to 40% by weight.

In preferred processes according to the invention, the division of the slip into drops is achieved by spraying. By spraying, very high production rates can be achieved. Moreover, the sizes of the drops, which determine or influence the sizes of the beads, can be controlled within fairly narrow limits by appropriate choice of the dimensions of the spray orifices and/or the pressure under which the slip is supplied.

The full potential benefits of the new process are best realized by projecting the slip drops into or through a furnace and keeping them in separated condition during the heating and cooling stages, by a gas stream or gas streams. It is, of course, not necessary for the formed beads to be kept in separated condition until they have cooled to room temperature. It is sufficient to keep them separated until they can come into contact with each other without mutual adherence. The maximum temperature at which they can be held together in bulk depends in any given case mainly on the nature of the binder. Preferably, the temperature in the heating stage is not more than 600° C. The observance of this condition is conducive to low costs.

Having referred to the main factors influencing the choice of processing conditions, reference will now be made to the choice of ingredients for the feedstock. The slip constituting the feedstock preferably contains dispersed glass particles. The glass can be of any type. Particular preference is for artificial glass because it is of predetermined uniform composition. However, it is within the scope of the invention to employ particles of natural glass, e.g. basalt, tuffstone, strass or pearlite. For low cost production, it is advantageous to use waste glass, e.g., cullet or glass derived from refuse or from residue of a refuse incineration plant. In certain recommended embodiments, use is made of high silica glass, such as ordinary soda-lime glass. In other embodiments, a borosilicate glass is used. These types of glass are mentioned as preferred examples.

As an alternative to or in addition to glass particles, the slip may contain dispersed particles of glass forming material. Examples of suitable glass-forming or so-called "batch" materials are those based on a mixture of several of the following: sand, sodium carbonate, borax, calcium carbonate, dolomite, feldspar, and so on, as is well known in glass-making. Some batch particles may be in dissolved state.

The term "particle" as used herein is used in a broad sense and includes small pieces of any shape, e.g. glass fibers. Generally speaking, it is most suitable to employ glass in pulverized form. Preferably, the dispersed glass or glass-forming particles have a maximum size of 1.0 mm or less. A very satisfactory size range for many purposes is 10 to 250 microns. However, particles above 1.0 mm maximum size can be employed. The sizes of the particles used in the production of given beads will be selected having regard to the sizes of such beads. For the purposes mainly in view, bead sizes in the range 100 microns to 10 mm are envisaged. When such beads are subjected to a firing step, they become converted to cellular glass bodies in the size range 100 microns to 8 mm. It is an important advantage of the invention, as compared with the known processes hereinbefore described, that it permits the formation of beads which by a simple firing step can be converted to cellular glass bodies below 3 mm in size and even below 1 mm, e.g., to cellular glass bodies in the size range from one hundred to several hundred microns.

The glass or glass-forming particles in the slip may be of substantially the same size. This substantial identity of size facilitates insuring a substantially uniform composition of the slip as it is divided into drops. On the other hand, for promoting the formation of a well-consolidated vitreous material on eventual heating of the beads to above the softening point of the glass or to glass-forming temperature as the case may be, advantages are to be gained by using particles distributed over a certain size range. Preferably, however, the size range is such that the largest particle size is not more than ten times the smallest particle size.

A range of different kinds of substances can be used as binder media. The binder medium is preferably one which is capable of retaining its function as binder, thus maintaining the cohesiveness of the individual beads, until a cohesive vitreous mass becomes formed from the glass or glass-forming particles during an eventual firing step. In such cases, the beads do not need to be under any external constraint when firing takes place.

Preferably, the binder dissolves in the liquid medium forming the continuous phase of the slip. In a modification of this procedure, use is made of a binder dissolved in a liquid which is immiscible with but is dispersed in the continuous phase of the slip. In both of the foregoing systems, a good distribution of the binder in the feedstock can be achieved, however, the first system is very much the better of the two.

In certain processes according to the invention, use is made of a binder which in an eventual firing step can be chemically integrated with the glass by heating the beads to temperatures above the glass-forming temperature. A particularly preferred binder is sodium silicate. Sodium silicate can be used in solution, e.g. in sufficient quantity to coat the individual glass or glass-forming particles and form a cohesive skin or matrix holding such particles together in a bead of the required volume.

Apart from sodium silicate, already mentioned, potassium silicate (which is also capable of chemical integration with the glass) can be used as a binder, also sodium or potassium hydroxide. Other suitable binders are to be found in the category of synthetic polymeric substances and we refer in particular to phenolic resins, polystyrene, polyurethane, vinyl polymers, polyesters, polyethers, silicones, various polycondensation products, e.g. urea-formaldehyde and phenol-formaldehyde resins and condensates of urethanes, epoxides, polyesters and polyamines. It is possible to use a thermosetting resins, such as Bakelite, which will decompose during eventual heating of the formed beads to a temperature sufficient to form the glass or glass-forming particles into a unitary vitreous mass.

The slip constituting the feedstock from which the beads are formed includes a cellulating agent. The term "cellulating agent" denotes a gaseous substance or a substance or combination of substances which gives rise to the evolution of gas causing cellulation of the beads, due to heating of such substance(s) during the bead-forming process, or which will give rise to the evolution of gas and cause cellulation if such beads are in a subsequent treatment heated to a higher temperature, e.g. a temperature sufficient to form the glass or glass-forming particles in the individual beads into a unitary vitreous mass. An example of a cellulating agent is a compound which decomposes on heating with evolution of gas. Another example is a combination of substances which on heating react, the reaction giving rise to the evolution of gas.

From the foregoing explanation it will be apparent that the bead-forming process which is the subject of the invention hereinbefore defined may, but does not necessarily, form beads which are cellulated. Whether or not the beads are of cellulated form, depends in each case on the gasifying agent employed, the nature of the binder and the temperature at which it becomes effective to bind the glass or glass-forming particles together, and the temperatures reached in the bead-forming process. The beads are referred to as "expansible" because in any case they can be expanded by heating them, due to either the evolution of gas or to the expansion of gas which is already present in the beads.

In some embodiments of the invention, the slip incorporates a cellulating agent which is gaseous at room temperature. Preferably this agent is air. Air bubbles can be incorporated in the slip by air injection or by agitation of the slip before it is divided into drops.

It is preferable, however, to include in the slip a cellulating agent which decomposes with evolution of gas during the heating stage of the bead-forming process as hereinbefore defined. Among the most favored cellulating agents in this category are carbonates, e.g. calcium carbonate and nitrates, e.g. sodium nitrate. Another cellulating agent which is particularly recommended, is urea.

In certain processes according to the invention, the slip includes a liquid, e.g. water, (which may form the continuous phase of the slip), which serves as the cellulating agent. The slip can accordingly be of very simple and inexpensive composition. In most processes according to the invention, the vaporization of the liquid will itself be responsible for some cellulating effect. This effect can be supplemented by the action of one or more other kinds of cellulating agents or the liquid may be relied upon as sole cellulating agent.

The invention includes processes wherein the slip incorporates a combustible substance as a cellulating agent or the only cellulating agent. In certain cases, the combustible substance is selected so that it burns during the heating stage of the bead-forming process. In other cases, the combustible substance is selected so that it will only burn and thus give rise to cellulation if the formed beads are heated to a temperature above that which is reached in the bead-forming process itself. In that case, the beads can be cellulated, or (if already cellulated by some other agent) further cellulated, by a subsequent treatment, e.g. a treatment wherein the beads are heated sufficiently to soften the glass particles and cause them to coalesce into a unitary vitreous mass.

Combustible substances which can be incorporated in the solids/liquid suspension include, e.g., carbon, fine coal, e.g. coal dust, graphite, coke, lignite, shale containing combustible residue, tar, charcoal and wood, e.g. wood chips or sawdust. Other suitable combustible materials are to be found in the field of synthetic polymeric substances. Among these, we refer for example to polystyrene, polyurethane, polyesters, vinyl polymers, phenolic resins and epoxy resins. Other types of combustibles which can be incorporated in the bodies include soft rubber and derivatives thereof, bituminous materials such as asphalt, and carbohydrates and carbohydrate derivatives, e.g. sugars, glycol, glycerine, cellulose and starch.

Preferably the slip contains a material which commences to burn or decompose with evolution of gas during heating to moderate temperature, e.g. below 500° C., and the drops are projected into or through a furnace as above referred to, the furnace temperature being such that said material is at least partially burned or decomposed and some expansion of the beads occurs during their formation, under the pressure of the gas thereby generated.

If, in a process according to the invention, a binder is selected which decomposes or undergoes inter- or intramolecular reaction with evolution of gas on being sufficiently heated, then it is not necessary to include another cellulating agent. The binder can in such cases serve a dual function. However, it is essential that the binder does not lose its essential binding function in respect of the glass or glass-forming particles during the bead-forming process. The temperature to which the binder has to be heated to give rise to the evolution of gas should therefore in such cases be above the temperature of any zone within which the suspension ingredients are held for any significant period of time during the bead-forming process. It will be apparent that various of the specific binders hereinbefore listed are capable of performing the two functions.

The invention includes expansible beads formed by a process as hereinbefore defined.

The invention also includes a process of forming cellulated bodies, which process comprises first forming expansible beads by a process according to the invention as hereinbefore defined and then heating such beads to cause expansion of the beads due to expansion of gas already contained therein and/or of gas evolved therein during such heat-treatment.

The invention includes a process of forming cellulated vitreous bodies, which process comprises first forming expansible beads by a process according to the invention as hereinbefore defined and then heating such beads sufficiently to cause softening and coalescense of the glass particles or formation of glass from the glass-forming particles, and integration of the glass into a unitary cellular mass.

In certain embodiments of this latter process the individual beads are kept in separated condition during the firing thereof and during a subsequent cooling stage, e.g., by means of one or more gas streams, in order to prevent the individual beads from becoming united. Such firing and cooling can be effected, e.g. in a fluidized bed. The firing of the beads can take place at any time subsequent to their manufacture. Such firing can take place in conjunction with the firing of other substances so that the one firing step serves a dual purpose, with overall energy economies.

Individual cellulated vitreous bodies formed from the beads can be used e.g. as filler in concrete or other materials for improving thermal insulation or merely as an aggregate to reduce the product density. Another use for such bodies is as a loose thermal insulation material in cavity walls and other situations. For forming a filler in ceramic ware, the beads can be incorporated in such ware prior to firing thereof so that the vitreous cellulated bodies are formed in situ during the firing of the ceramic material.

In other processes for forming cellulated vitreous bodies, a mass of the beads is subjected to a heat treatment while they are in contact with each other so that the beads become united into a monolithic vitreous mass. This procedure may be followed for producing cellular glass bricks or other products.

Various examples of processes according to the invention will now be described. In the course of these examples reference will be made to the accompanying drawing. This drawing is a diagrammatic representation of apparatus suitable for use in carrying out the invention.

EXAMPLE 1

An aqueous solution of sodium silicate (38 Baume) was fed from a container 1 into a mixing vessel 2 provided with stirring arms 3 driven by a motor 4. At the same time glass grains (size range 20–100 microns) mixed with powdered urea were introduced into the mixing vessel from a container 5. The glass had the following composition in percentages by weight: 70.4% $SiO_2$, 12.78 $Na_2O$, 12.14 CaO, 1.77 MgO, 1.92 $Al_2O_3$, the remainder being impurities. The sodium silicate solution was introduced into the vessel 2 in an amount of 10.5 liters per 20 Kg of the glass. The urea was introduced in an amount equal to 2% by weight based on the weight of the glass. The slip was discharged from vessel 2 into a further vessel 6 fitted with a stirrer 7 driven by a motor 8. The viscosity of the slip in vessel 6 was measured by a viscosameter 9 and in dependence on the viscosity measurement, water was introduced into vessel 2 via feed line 10 so that the viscosity of the slip entering vessel 6 was maintained at substantially 3000 cps. The slip was pumped from vessel 6 via a filter 11 by a pump 12 to one or more spray heads 13 in a drying tower 14, at the rate of 15 to 20 liters per minute. Air under pressure was fed as required to the spray heads from a source 15. The drops of the slip 4 discharged from the spray head(s) 13 were of various sizes in the range 100–1000 microns.

Hot gases discharging from a shaft furnace 16, presently to be described, were fed via gas line 17 into the base of the drying tower 14. The gases on entry into the drying tower had a temperature in the range 200° to 400° C. The drops discharging from the spray head(s) 13, whole being rapidly heated in such tower, were entrained upwards by the ascending hot gas streams. In the drying tower 14, water evaporated from the ascending drops so that they became converted into self-sustaining beads containing the glass particles held together by sodium silicate as binder. At the same time, some decomposition of the urea took place with the evolution of gases so that some expansion of the embryonic beads took place. The formed beads discharged continuously from the top of the drying tower 14 into a gas separator 18 in which the beads gravitated preparatory to being fed into the shaft furnace 16. On leaving the top of the drying tower 14, the beads had solidified and dried sufficiently for them to be able to be collected in bulk without mutual adhesion. Examination of samples of beads taken from the separator 18 showed that each of a predominent number of them comprised a group of glass grains held together by a sodium silicate skin which extended around each of the glass grains and around the whole group as an enveloping surface layer. Within the body, between the coated glass grains, there were small cells filled with gases resulting from the partial decomposition of the urea. The bulk density of the beads was of the order of 0.4 to 0.6 $g/cm^3$.

The process according to this Example as so far described embodies the present invention. The manner in which the beads formed by such process are handled and further processed or used is open to choice. Beads manufactured by a process according to the present invention are well suited for conversion by a firing step into cellular glass bodies and the invention is of particular value when performed as part of a process of manufacturing such bodies.

In the present Example, the production of the beads took place as part of a continuous process of forming such cellular glass bodies and the conversion of the beads to the cellular glass bodies was achieved in a step which immediately followed the bead formation. However, such conversion need not take place immediately after formation of the beads. For example, the latter can be collected and stored for some period of time before being subjected to any further processing.

In the present Example, the beads were discharged from the separator 18 along a chute 19 and into the shaft furnace 16. This furnace is gas-fired furnace having an array of gas burners 20 at its base. These burners are fed with fuel gas via fuel lines 21 and with air via air line 22. The furnace was maintained at an operating temperature in the range 800° to 1200° C. The ascending currents of combustion gases carried the beads upwardly along the shaft. The glass grains in the individual beads softened and sodium silicate became chemically integrated with the glass. The beads expanded due to further decomposition of urea and increase of gas pressure within the beads. The beads were thus converted into cellular glass bodies which were carried out of the top of the furnace into a receiver 23. Hot gases discharged from the top of this receiver and were fed into the base of the drying tower 14 via gas line 17 after being passed through a heat exchanger 24 in which some of the heat of such hot gases was transferred to the air stream which was supplied via air line 22 to the shaft furnace burners 20.

In the receiver 23, the cellulated glass bodies were cooled to below the softening range of the glass before the bodies came together in bulk. The bodies discharged from the receiver along chute 25.

The cellulated glass bodies collected from the receiver 23 were examined. The bodies were of more or less spherical form and of sizes distributed over the range 150 microns to 2.5 millimeters. The bodies were mainly hollow, the hollow bodies having a vitreous shell containing small gas-filled cells. The bodies had a bulk density of the order of 0.25 $g/cm^3$.

Comparison of bodies in different parts of the aforesaid size range showed that at the upper end of the size range the tendency for the vitreous material to be confined to the periphery of the bodies and thus to form shells enveloping a single large cell was less at the upper end of the size range over which the bodies were distributed. Many of the largest of the bodies contained a plurality of relatively large cells within a microcellular matrix. At the lower end of the size range the presence of microcells within the vitreous hollow cells was less in evidence than in the case of the larger bodies. These observations suggest that other things being equal, the production of hollow beads or bodies formed therefrom in which solid material is substantially confined to a peripheral skin or shell can be promoted by dividing the initial slip into relatively small droplets.

In modifications of the process constituting the above Example, the influence of the quantity of cellulating agent in the slip and the firing temperature of the expansible beads was examined. It was found that by increasing the amount of cellulating agent and/or by increasing the firing temperature above the values employed in the said Example, the number of vitreous bodies in the upper end of the size range which contained a unicellular core was increased.

EXAMPLE 2

Expansible beads comprising glass particles held together by a binder were formed as in Example 1 but omitting the urea from the composition of the slip. Notwithstanding the absence of urea, the beads, which were collected from the gas separator 18 of the apparatus shown in the accompanying drawing, were found to contain cells. During the treatment in the drying tower 14, displacement of the glass/binder composition had taken place in the individual drops under internal pressure exerted by water vapor, leaving small cells within the beads. The average cell/bead volume ratio was smaller than in the case of the beads discharged from the drying tower in the process according to Example 1. The beads formed with reliance on the water as cellulating agent could be converted into monolithic cellular glass bodies by feeding the beads into the shaft furnace 16 and processing them therein in the same way as the beads in Example 1.

EXAMPLE 3

Expansible beads were formed as in Example 1 but with the modification that instead of the urea, calcium carbonate powder (average grain size 0.08 micron) was employed in an amount of 3% by weight based on the weight of the glass. The prepared slip thus contained substantially the same proportion of water, namely 35% by weight, as the slip used in Example 1. The temperature in the drying tower 14 was 500° to 600° C.

The expansible beads, which were collected from the gas separator 18, had a bulk density of the order of 0.8 to 1.0 g/cm$^3$. These beads could be converted into cellular glass bodies in the same way as the beads in Example 1.

EXAMPLE 4

An aqueous solution of potassium silicate containing 40 g of dry silicate per liter of water was fed into mixing vessel 2 from the container 1. At the same time, glass grain between 60 and 150 microns in size and composed of glass of the same composition as that used in Example 1, were fed into the vessel 2 from container 5 together with powdered carbon of the same particle size range as the glass. The weight ratio of carbon to glass was 1:2. The potassium silicate solution was fed into vessel 2 in an amount of 10 liters per 20 Kg of the glass. The viscosity of the slip thus produced was adjusted by addition of water to approximately 500 cp (corresponding with less than 40% by weight of water). This slip was sprayed into the drying tower 14 in the form of drops in the size range 100–500 microns. The temperature in the drying tower was 300° C.

During the heating in the drying tower 14, the aqueous solution of potassium silicate in each drop dried leaving a cohesive skin eveloping the individual glass grains in that drop and serving as an adhesive or binder holding the glass grains together as an agglomerate within each bead leaving the tower. The beads collected from gas separator 18 were of a cellular structure, the minute cells having been formed as a result of the evaporation of water within the beads during their formation. The beads had an average size of 150 to 1500 microns and a bulk density of 0.4 g/cm$^3$.

In a subsequent manufacturing step, the beads discharged from the drying tower 14 were fired in a furnace like furnace 16 in the drawing at a temperature of 1000° C. During this firing, the carbon particles burned and the glass softened and commenced to flow under the pressure of the entrapped gas. The potassium silicate binder became chemically integrated with the glass. Examination of the bodies leaving the furnace after cooling of such bodies, showed that each body was composed of a unitary mass of glass and had a cellular structure. The bodies had a bulk density of 0.25 g/cm$^3$.

EXAMPLE 5

Bodies were produced starting from comminuted vitrifiable substances namely, sand, sodium carbonate and borax in relative quantities appropriate for forming a glass of the following composition by weight: 72% $SiO_2$, 12% $B_2O_3$, 13% $Na_2O$ and minor amount of impurities. This glass batch together with sodium nitrate in an amount of 2% by weight was fed into the vessel 2 of apparatus as used in Example 1 and shown in the accompanying drawing, from container 5 of that apparatus. At the same time an aqueous solution of sodium hydroxide containing 500g of sodium hydroxide per liter of water was fed into the mixer from container 1. The different ingredients were mixed in the relative proportions of 12 liters of sodium hydroxide solution per 20 Kg of the glass batch. The viscosity of the slip was adjusted to 1000 cp, corresponding with approximately 40% by weight of water. The slip was sprayed in the drying tower 14 in the form of drops in the size range 150 microns to 1.5 mm. The temperature in the drying tower was 250° C. During the ascent of the drops in the tower, water evaporated leaving the sodium hydroxide on the batch particles and this sodium hydroxide served as binder which held the batch particles together in the individual beads discharged from the top of the tower. Examination of the beads collected from the gas separator 18 showed that they contained numerous small cells due to the evaporation of water from the slip drop during the formation of the beads. The beads had a size of 200 microns to 2 mm.

In a subsequent processing stage, the beads produced as above described were fired at 1000° C. During this firing stage the sodium nitrate decomposed with evolution of gas. Also, the glass batch materials within each body were melted and they entered into a glass-forming reaction. The metal oxide residue from the decomposition of the sodium hydroxide became chemically integrated with the formed glass. Examination of the resulting vitreous bodies after cooling thereof showed that each body was composed of a unitary mass of glass and had a cellular structure. The glass bodies had a bulk density of 0.25 g/cm$^3$.

EXAMPLE 6

Expansible beads were produced starting from vitrifiable substances in the size range 60 to 150 microns, wood chips in the same size range and a solution of sodium hydroxide for forming a binder. The vitrifiable substances were sand, sodium carbonate, calcium carbonate, dolomite and feldspar in relative proportions appropriate for forming a glass of the following composition by weight: 73.6% $SiO_2$, 17.2% $Na_2O$, 5.37% CaO, 3.67% MgO and 0.9% $Al_2O_3$, the remainders being impurities.

The solution of sodium hydroxide (concentration 50%) was fed into the mixing vessel 2 of apparatus as used in Example 1 and shown in the accompanying drawing, from container 1. The vitrifiable substances, mixed with the wood chips were fed into the vessel from container 5. The wood chips were fed in an amount of 60 Kg per 100 Kg of the vitrifiable substances. The solution of sodium hydroxide was fed in an amount of 15 liters per 25 Kg of said vitrifiable substances.

The viscosity of the slip was adjusted to 1000 cp, corresponding with a water content of approximately 30% by weight. The slip was sprayed into the drying tower 14 in the form of drops in a size range up to 2 mm. The drying tower temperature was 350° C. In the drying tower, the particles of vitrifiable substances in each of the sprayed drops became bonded together by the associated quantity of binder. The beads collected from the top of the drying tower contained small cells due to evaporation of water, and had a sponge-like structure. They had an average size of 200 microns to 2 mm.

In a subsequent processing stage, the beads were fired at a temperature of 1200° C. During this firing step the wood chips within the beads burned and the vitrifiable substance entered into a glass-forming reaction. Examination of the resulting vitreous bodies after cooling thereof showed that each body was composed of a unitary mass of glass and was of a multi-cellular structure. The bodies had a bulk density of 0.2 g/cm³.

EXAMPLE 7

Expansible beads were formed from glass particles in the size range 60 to 150 microns, urea, and sodium silicate solution (38 Baume). The glass had the same composition as that used in Example 1. The urea was used in a proportion of 2% by weight based on the weight of the glass. The sodium silicate solution was used in an amount of 10.5 liters per 20 Kg of glass. Water was added to bring the viscosity of the slip to approximately 5000 cp, corresponding with approximately 35% by weight of water.

The sodium silicate solution on the one hand and the glass particles mixed with the powdered urea on the other hand, were fed from containers 1 and 5 respectively into mixing vessel 2 of the apparatus, as used in Example 1 and shown in the accompanying drawing, and water was added in dependence on the viscosity measured in vessel 6.

The slip was sprayed into the drying tower 14 in the form of drops in the size range 150 microns to 1.5 mm. The drying tower temperature was 300° C. In the drying tower, water evaporated. Each of the beads collected from the drying tower comprised glass particles held together by sodium silicate. The bodies contained cells due to evaporation of water from the drops during heating in the drying tower. The beads were in the size range 200 microns to 2 mm and had a bulk density of 0.4 g/cm³.

In a subsequent processing stage the beads were fired at 1000° C. In this firing treatment, the urea decomposed with evalution of gas. The glass particles melted and the quantities of molten glass merged to form a unitary mass. Outward displacement of molten glass occurred under the internal pressure created by the gas. The sodium silicate became chemically integrated with the glass. Examination of the resulting vitreous bodies after cooling thereof showed that they were composed of a unitary mass of glass and had a cellular structure. The glass bodies had a bulk density of 0.2 g/cm³.

The same example was repeated but with the modification that the slip from which the expansible beads were formed included saw dust. In the processing, the saw dust in the individual beads burned. Vitreous cellular bodies were again obtained.

EXAMPLE 8

Expansible beads were formed using a process like Example 7 but using a resin of polystyrene dissolved in a benzene solution in place of the urea. The beads collected from the drying tower, the temperature of which was 150° C., contained cells due to evaporation of the solvent from the sprayed drops in the tower. However, the average cell/bead volume ratio was found to be smaller than in the preceding case (Example 7). The beads had a multicellular structure and could be further processed in the same way as the beads in Example 7.

What is claimed is:

1. A process for the preparation of expansible beads which are convertible by firing into cellular glass bodies, said process comprising the steps of:
    preparing a slip having a liquid medium continuous phase and a disperse phase, said slip containing particles of glass or glass-forming material, a cellulating agent, and a binder, the disperse phase of said slip including at least most of said particles,
    dividing said slip into drops, said slip which is divided into drops having a viscosity in the range 200 to 10,000 cp, and
    subjecting said drops while in divided condition to a heat treatment including heating and cooling stages so as to cause evaporation of liquid from said drops and conversion thereof into self-sustaining beads in which said glass or glass-forming particles are held together by said binder and which contain said cellulating agent or gas derived therefrom.

2. A process according to claim 1, wherein the drops into which said slip is divided are in the size range 100 to 3000 microns.

3. A process according to claim 1, wherein the liquid medium includes water.

4. A process according to claim 3, wherein the water is present in a proportion of less than 50% by weight based on the total weight of said slip.

5. A process according to claim 4, wherein the water proportion is in a range of 20 to 40%.

6. A process according to claim 1, wherein the division of said slip into drops is achieved by spraying.

7. A process according to claim 1, wherein said drops are projected into a furnace and are kept in separated condition, during the heating and cooling stages, by a gas stream therein.

8. A process according to claim 1, wherein the temperature in said heating stage is not more than 600° C.

9. A process according to claim 1, wherein said particles consist of particles of soda-lime glass.

10. A process according to claim 1, wherein the glass or glass-forming particles in said slip are in the size range of 10 to 250 microns.

11. A process according to claim 1, wherein said binder is dissolved in the liquid medium forming the continuous phase of said slip.

12. A process according to claim 1, wherein said binder is of a composition such that it can be chemically integrated with said particles by heating said self-sustaining beads to temperatures above glass-forming temperature.

13. A process according to claim 1, wherein said binder comprises sodium silicate.

14. A process according to claim 1, wherein said cellulating agent comprises a material which decomposes with evolution of gas during the heating stage of said heating treatment.

15. A process according to claim 1, wherein said cellulating agent comprises a carbonate or nitrate.

16. A process according to claim 1, wherein said cellulating agent comprises urea.

17. A process according to claim 1, wherein said cellulating agent forms at least a part of said liquid medium.

18. A process according to claim 1, wherein said cellulating agent comprises a combustible substance.

19. A process according to claim 18, wherein said combustible substance comprises a substance which burns only when the beads resulting from the process are subsequently heated to a temperature above that which is reached in the heating stage of said heating treatment.

20. A process according to claim 18, wherein said combustible substance is selected from the group consisting of carbon, fine coal, graphite, coke, lignite, shale containing combustible residue, tar, charcoal and wood.

21. A process of forming cellulated vitreous bodies, comprising the steps of forming expansible beads by a process according to claim 1 and then heating said beads sufficiently to cause softening and coalescence of the glass particles of formation of glass from the glass-forming particles.

22. A process according to claim 21, wherein said beads are kept in separated condition during the heating thereof and during a subsequent cooling stage.

23. A process according to claim 21, wherein said beads are kept in contact during the heating thereof so that the beads become united into a monolithic vitreous mass.

* * * * *